J. BROWN.
GRASS EDGE TRIMMING MACHINE.
APPLICATION FILED JUNE 3, 1915.

1,208,741. Patented Dec. 19, 1916.

Witness
L. R. Fiedler

Inventor
John Brown
By Wm. F. Doyle
Attorney

UNITED STATES PATENT OFFICE.

JOHN BROWN, OF NEW YORK, N. Y.

GRASS-EDGE-TRIMMING MACHINE.

1,208,741.  Specification of Letters Patent.  Patented Dec. 19, 1916.

Application filed June 3, 1915. Serial No. 32,022.

*To all whom it may concern:*

Be it known that I, JOHN BROWN, residing at 16 Rivington street, New York, in the county of New York and State of New York, have invented a new and useful Improvement in Grass-Edge-Trimming Machines, of which the following is a specification.

The invention relates to a grass edge trimming machine and particularly to a structure adapted to be operated by hand in the same manner as an ordinary lawn mower to cut grass growing along the edge or margin of constructed borders, driveways, flower beds, walks or pathways.

The invention has for an object to provide a new and improved construction of such a machine in which the parts are carried by driving and supporting rollers at opposite ends of the side plates and the fixed knife carried by said plates extends downwardly to the level of the lowest point in the periphery of said rollers, while the cutting blades are driven from one of said rollers and coöperate with said fixed knife.

Other and further objects of the invention will be hereinafter set forth and the novel features thereof defined by the appended claims.

Figure 1:
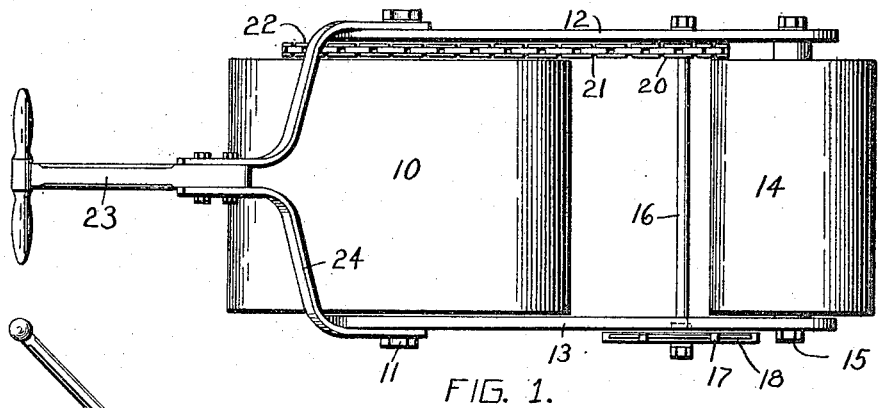
Figure 2:
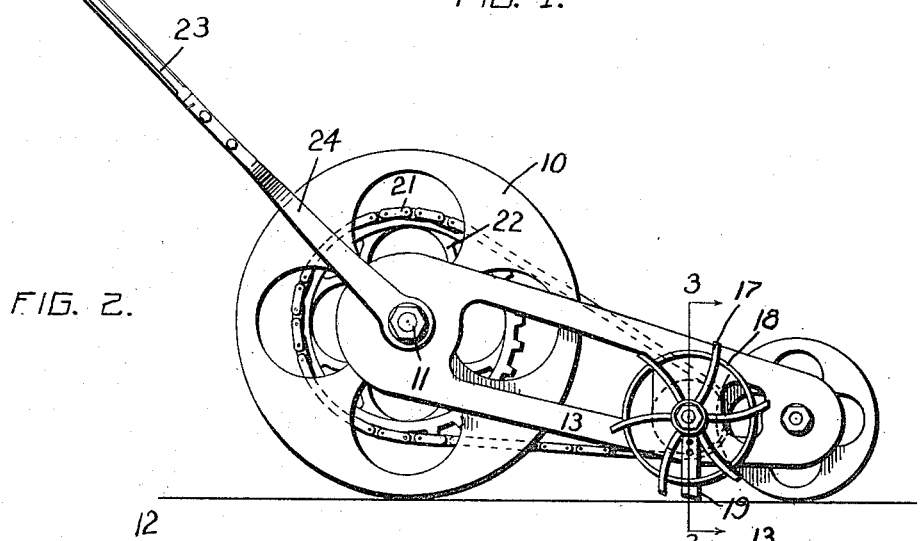

In the drawing, Figure 1 is a top plan view of the machine; Fig. 2 a side elevation thereof; and Fig. 3 an enlarged section on the line 3—3, of Fig. 2.

Like numerals of reference refer to like parts in the several figures of the drawings.

Figure 3:
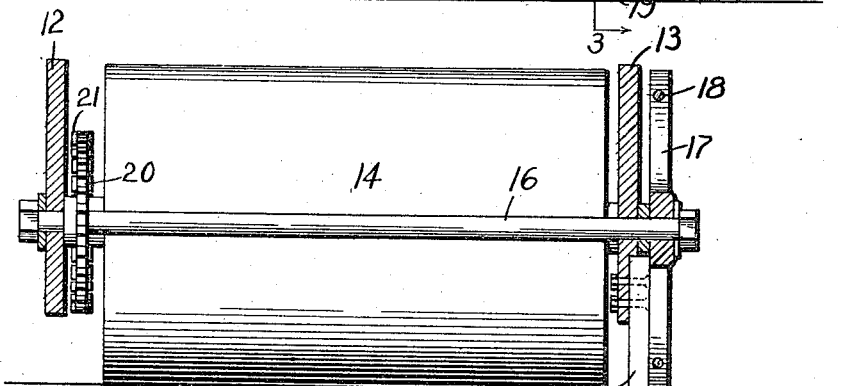

The numeral 10 designates the driving or traction roller, the shaft 11 of which is pivotally mounted in the side plates 12 and 13 so that these plates have a swinging movement upon the shaft of the roller 10. The forward ends of the plates 12 and 13 carry a supporting roller 14, the shaft 15 thereof being mounted in said plates. Intermediate of the driving and supporting rollers, a cutter shaft 16 is mounted in the side plates and provided at one end with a cutting wheel 17 comprising a series of blades connected by a rim 18 and these blades may be either curved, as shown in Fig. 2, or straight. In their rotation, they coöperate with a fixed knife 19 carried by the side plate 13, as shown in Figs. 2 and 3. This fixed knife and also the coöperating cutter wheel or blades extend downwardly from the side plate to the level of the lowest point in the periphery of the rollers which particularly adapts the invention for use in trimming the edges of lawns adjacent cement or other solid walks or pathways, as neither of the cutting devices extends below the level of the driving and supporting rollers for the device. This prevents any plowing action of the cutters into the earth and the natural resistance thereof which would prevent the necessary high speed of rotation to cut wire or other tough grass overlying the edge of the walk.

For the purpose of driving the cutter shaft 16, the latter is provided with a sprocket wheel 20 and a chain 21 extending therefrom to a sprocket 22 secured upon the shaft of the driving roller 10. This shaft is also provided with a handle 23 for operating the same secured thereto by means of the yoke members 24 mounted upon the extended ends of the shaft 11.

From the foregoing description, the operation of the invention will be apparent and it will be noted that the pivotal mounting of the side plates upon the axis of the driving roller with the chain drive from the shaft thereof to the rotary cutter provides means by which the forward end of the structure will automatically adapt itself to variations in the elevation of the sod over which it is passed and that this chain drive effects a high speed of rotation for the shaft of the cutter which could not be secured by a geared connection or if the latter entered the ground with a plowing action. Such conditions would offer resistance to the operation of the machine which would prevent the speed of rotation of the rotary cutter necessary to produce an effective trimming at the edge of a grass plot adjacent a walk or pathway.

What I claim is:—

1. A grass edge trimming machine comprising side plates, a shaft journaled therein near their forward ends and provided with a supporting roller, a second shaft journaled in the side plates adjacent their rear ends and provided with a driving roller, a fixed knife extending downwardly from one of the side plates to the level of the lowest point in the periphery of said rollers, a cutter shaft journaled in the side plates between the two rollers, means for rotating said shaft from one of said rollers, and blades carried by said shaft to coöperate with the fixed knife.

2. A grass edge trimming machine comprising side plates, a shaft journaled therein near their forward ends and provided with a supporting roller, a second shaft journaled in the side plates adjacent their rear ends and provided with a driving roller, a fixed knife extending downwardly from one of the side plates to the level of the lowest point in the periphery of said rollers, a cutter shaft journaled in the side plates between the two rollers, a chain drive from the shaft of the driving roller to said cutter shaft, curved blades carried by said cutter shaft to coöperate with the fixed knife, and a handle mounted upon the shaft of the driving roller.

JOHN BROWN.

Witnesses:
JOHN F. SPENCE,
PETER H. YOUNG.

Copies of this patent may be obtained for five cents each, by addressing the "Commissioner of Patents, Washington, D. C."